219-121 SR

4/15/86 OR 4,582,976

United States Patent [19]

Merrick

[11] Patent Number: 4,582,976

[45] Date of Patent: Apr. 15, 1986

[54] METHOD OF ADJUSTING A TEMPERATURE COMPENSATING RESISTOR WHILE IT IS IN A CIRCUIT

[75] Inventor: Edwin B. Merrick, Stow, Mass.

[73] Assignee: Hewlett-Packard Company, Palo Alto, Calif.

[21] Appl. No.: 640,064

[22] Filed: Aug. 13, 1984

[51] Int. Cl.[4] .............................................. B23K 26/00

[52] U.S. Cl. ............................ 219/121 LJ; 29/610 R; 338/195

[58] Field of Search .................. 219/121 LJ, 121 LH; 338/195, 314, 320; 29/620, 610 R

[56] References Cited

U.S. PATENT DOCUMENTS 3,649,801 3/1972 Cardell et al. .................. 338/195 X 4,041,440 8/1977 Davis et al. ......................... 338/195

*Primary Examiner*—C. L. Albritton

*Attorney, Agent, or Firm*—Donald N. Timbie

[57] ABSTRACT

A method of providing a temperature compensating resistor having a desired ohmic change with temperature comprising the steps of connecting a resistor $R_T$ that is made of material having a high temperature coefficient in parallel with a resistor $R_S$ that is made of material having a lower temperature coefficient, connecting the parallel combination in a circuit and increasing the value of $R_S$ by cutting it with a laser until the circuit indicates that the desired result is obtained.

3 Claims, 1 Drawing Figure

METHOD OF ADJUSTING A TEMPERATURE COMPENSATING RESISTOR WHILE IT IS IN A CIRCUIT

BACKGROUND OF THE INVENTION

The effect of changes in temperature on the operation of some circuits can be compensated for by including one or more resistors therein having an ohmic value that changes by an appropriate amount for each change in temperature of one degree. Such resistors are usually made of material such as gold or platinum that has a high temperature coefficient TC, i.e., a high fractional change in resistance for each change of one degree. The actual change per degree in resistance of such a resistor from the value RT it has at a given temperature is equal to the product of RT and the temperature coefficient TC of the material from which it is made.

Some electrical equipment is comprised of a device requiring temperature compensation that is coupled to a printed circuit containing the temperature compensating resistor. In most cases, each device will require a different temperature compensating resistor. If discrete resistors are to be used, each device is tested to determine the ohmic change with temperature that the temperature compensating resistor must provide and such a resistor is selected and connected to the printed circuit. This procedure has the disadvantage of requiring a large number of resistors with different temperature characteristics to be kept on hand. Furthermore, it is often difficult or expensive to connect the resistors to the printed circuit. It would, therefore be advantageous to make the resistor an integral part of the circuit.

It would be possible to provide a resistor that is an integral part of the printed circuit that is made of material having a high temperature coefficient and trim it with a laser or other means until some measured voltage or current in the circuit device indicated that the correct value had been attained, but the heat usually introduced by the trimming would change the resistance of the resistor appreciably so that it would be necessary to let it cool before the circuit could give an accurate indication. In order to avoid trimming too much, it would be necessary to trim a little bit at a time in each of a series of steps and wait for the resistor to cool after each one.

BRIEF SUMMARY OF THE INVENTION

In accordance with this invention, a method is provided for adjusting temperature compensating resistors while they are connected in a circuit. The resistors are such that they can be formed as an integral part of a printed or hybrid or thin-film circuit. The resistor itself is comprised of a resistor RT made of material having a high temperature coefficient connected in shunt with a resistor RS made of material having a low temperature coefficient. When such a parallel combination of resistors is connected in a circuit, the value of the shunt resistor RS can be adjusted with a laser or other means until the circuit indicates in some way that the parallel combination either has the required temperature compensating effect or the required resistance. While the value of the resistance of RS is being changed in this manner, it is not affected by the heat usually introduced by such a procedure because of its low thermal coefficient so that the fixed desired value can be reached in a single trimming operation and there is no necessity to wait for the resistor to cool. The resistors RT and RS can be formed as an integral part of the circuit board of the equipment but, if it is desired, a discrete parallel combination can be used. The method can also be used to make discrete parallel combinations having a desired resistance by connecting them to an ohmeter while RS is being adjusted.

THE DRAWING

The single figure of the drawing illustrates a temperature compensating resistance constructed in accordance with this invention and the euqipment used in its fabrication.

DETAILED DESCRIPTION OF THE INVENTION

Figure 1:
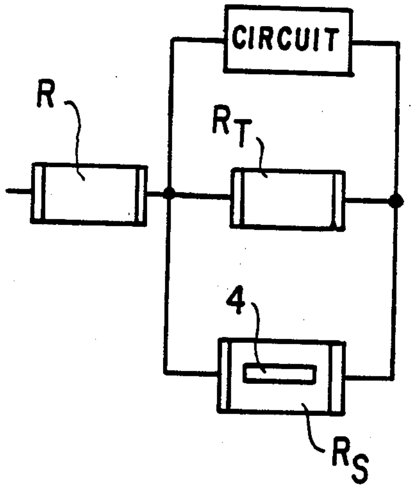

Reference is now made to the drawing in which a resistor RT that is made of material such as gold or platinum having a relatively high temperature coefficient TCT is connected in parallel with a resistor RS that is made of material such as nichrome having a very low temperature coefficient TCS. The parallel combination is connected in a circuit 2 which may be an ohmeter. If more resistance is needed in the circuit than the resistance RP of RT and RS in parallel, a resistor R can be connected in series parallel with RT and RS.

A laser, not shown, or any other suitable means is used to reduce the cross-sectional area of RS as by cutting an opening 4 therein so as to increase its resistance until the circuit 2 indicates that the resistance $R_P$ of $R_S$ and $R_T$ in parallel has reached the required value.

The change in ohmic value for each degree change in temperature, $T_{RP}$, for the parallel combination of $R_T$ and $R_S$ as well as the value of $R_P$ corresponding to that coefficient may be derived as follows:

$$R_P = \frac{R_T \times R_S}{R_T + R_S} \qquad (1)$$

In the following expressions, N=numerator, D=demoninator and t=temperature:

$$\frac{dR_P}{dt} = \frac{\left(D\frac{dN}{dt}\right) - \left(N\frac{dD}{dt}\right)}{D^2} \qquad (2)$$

$$\frac{dN}{dt} = [R_S(dR_T/dt)] + [R_T(dR_S/dt)] \qquad (3)$$

(4) $dD/dt = (dR_T/dt) + (dR_S/dt)$

After eliminating the terms containing $dR_S/dt$ because the temperature coefficient of $R_S$ is practically zero, the substitution of (3) and (4) and the actual values of N and D in (2) yields:

$$\frac{dR_P}{dt} = \frac{(R_T + R_S)R_S\frac{dR_T}{dt} - R_TR_S\frac{dR_T}{dt}}{(R_T + R_S)^2} \qquad (5)$$

By algebraic simplification, we obtain:

$$\frac{dR_P}{dt} = \frac{R_S^2}{(R_T + R_S)^2} \cdot \frac{dR_T}{dt} \qquad (6)$$

The fractional change in the parallel resistance $R_P$ for a change in temperature of one degree, or the temperature coefficient $T_{RP}$ of $R_P$ is found by dividing $dR_P/dt$ by $R_P$.

$$T_{RP} = \frac{(dR_P/dt)}{R_P} \tag{7}$$

Substituting (6) and (1) in (7) and simplifying yields:

$$T_{RP} = \frac{R_S}{R_T(R_T + R_S)} \times (dR_T/dt) \tag{8}$$

By substituting $R_T T_{CT}$ for $dR_T/dt$, we obtain:

$$T_{RP} = \frac{R_S}{R_T(R_T + R_S)} \cdot R_T T_{CT} \tag{9}$$

If the lowest value of the ohmic change $T_{RP}$ for each changes of one degree in temperature is known for a given circuit, the values of $R_T$ and $R_S$ are chosen so that $T_{RP}$, as determined from equation (9), has a still lower value, and the cross-section of $R_S$ is reduced until the circuit indicates that the desired temperature compensating effect has been attained. A simple way of doing this is to make the resistance of $R_S$ very low. By way of example, assume that the device requiring temperature compensation is a capacitive pressure transducer. After a pressure reading for ambient pressure and temperature is taken, the temperature of the transducer is increased to a predetermined value and a second pressure reading is taken. From these two pressure reading, the change in pressure for a degree change in temperature is derived, and from analysis of the circuit, the pressure reading that should be attained when the temperature compensating resistor has the appropriate value can be determined. In some circuits, this may be zero but in others it could have an offset. If the latter situation prevails, there will be a separate adjustment to bring the effect to zero.

If it is desired to make a parallel combination of $R_T$ and $R_S$ have a given temperature coefficient $T_{RP}$, the resistance of $R_T$ alone is determined and the value of $R_S$ is calculated from equation (9). The values of $R_T$ and $R_S$ are inserted in equation (1) so as to determine $R_P$ and an ohmeter is connected across the parallel combination. $R_S$ is then increased with a laser until the ohmeter indicates that the value of $R_P$ has been attained.

What is claimed is:

1. A method of making a resistor having a resistance that changes by an adjustable amount for a change of one degree in temperature, comprising
   connecting a resistor RT having a given temperature coefficient in parallel with a resistor RS having a lower temperature coefficient, and
   increasing the resistance of RS until the temperature coefficient of the parallel combination reaches the desired value.

2. A method as set forth in claim 1 wherein the resistance of RS is increased by means that raise its temperature.

3. A method as set forth in claim 1 wherein the resistance of RS is increased by reducing its cross-section with a laser.

* * * * *